(12) United States Patent
Kahn et al.

(10) Patent No.: US 7,580,523 B2
(45) Date of Patent: Aug. 25, 2009

(54) DISTRIBUTION OF VIDEO CONTENT USING CLIENT TO HOST PAIRING OF INTEGRATED RECEIVERS/DECODERS

(75) Inventors: Raynold M. Kahn, Los Angeles, CA (US); Gregory J. Gagnon, Torrance, CA (US); Christopher P. Curren, Brentwood, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 452 days.

(21) Appl. No.: 10/758,865

(22) Filed: Jan. 16, 2004

(65) Prior Publication Data

US 2008/0019529 A1    Jan. 24, 2008

(51) Int. Cl.
*H04N 7/167* (2006.01)
*H04L 9/00* (2006.01)

(52) U.S. Cl. .................. 380/240; 380/239; 380/242; 380/281; 380/284; 380/212; 713/176; 726/27; 726/20

(58) Field of Classification Search ............ 380/240, 380/239, 242, 281, 284, 212; 726/29
See application file for complete search history.

(56) References Cited

U.S. PATENT DOCUMENTS

| | | |
|---|---|---|
| 4,613,901 A | 9/1986 | Gilhousen et al. |
| 4,633,309 A | 12/1986 | Li et al. |
| 4,675,732 A | 6/1987 | Oleson |
| 4,694,490 A | 9/1987 | Harvey et al. |
| 4,866,769 A | 9/1989 | Karp |
| 4,866,787 A | 9/1989 | Olesen |
| 5,033,084 A | 7/1991 | Beecher |
| 5,132,992 A | 7/1992 | Yurt et al. |
| 5,168,353 A | 12/1992 | Walker et al. |
| 5,172,413 A | 12/1992 | Bradley et al. |
| 5,199,066 A | 3/1993 | Logan et al. |
| 5,301,245 A * | 4/1994 | Endoh ..................... 380/242 |
| 5,301,352 A | 4/1994 | Nakagawa et al. |

(Continued)

FOREIGN PATENT DOCUMENTS

EP    0677949    10/1995

(Continued)

OTHER PUBLICATIONS

"PKCS #1 v2.1: RSA Cryptography Standard," Jun. 14, 2002. RSA Laboratories. 61 pages.*

(Continued)

*Primary Examiner*—Kaveh Abrishamkar

(57) ABSTRACT

A host receiver and a client receiver are operatively in a direct broadcast satellite system. Program materials received by the host receiver from the direct broadcast satellite system are decrypted by the host receiver. The decrypted program materials are then encrypted at the host receiver using a copy protection key. The copy protection key is encrypted at the host receiver using a host-client pairing key shared between the host receiver and client receiver. The encrypted program materials and the encrypted copy protection key are transferred from the host receiver to the client receiver. The transferred copy protection key is decrypted at the client receiver using the host-client pairing key. The transferred program materials are then decrypted at the client receiver using the decrypted copy protection key.

22 Claims, 7 Drawing Sheets

U.S. PATENT DOCUMENTS

| | | |
|---|---|---|
| 5,335,277 A | 8/1994 | Harvey et al. |
| 5,357,276 A | 10/1994 | Banker et al. |
| 5,371,551 A | 12/1994 | Logan et al. |
| 5,386,587 A | 1/1995 | Yuzawa |
| 5,396,293 A | 3/1995 | Shellard |
| 5,421,031 A | 5/1995 | De Bey |
| 5,438,423 A | 8/1995 | Lynch et al. |
| 5,440,336 A | 8/1995 | Buhro et al. |
| 5,481,609 A | 1/1996 | Cohen et al. |
| 5,495,531 A | 2/1996 | Smiedt |
| 5,506,902 A | 4/1996 | Kubota |
| 5,557,541 A | 9/1996 | Schulhof et al. |
| 5,565,805 A | 10/1996 | Nakagawa et al. |
| 5,583,937 A | 12/1996 | Ulrich et al. |
| 5,586,264 A | 12/1996 | Belknap et al. |
| 5,592,551 A | 1/1997 | Lett et al. |
| 5,592,651 A | 1/1997 | Rackman |
| 5,594,491 A | 1/1997 | Hodge et al. |
| 5,619,247 A | 4/1997 | Russo |
| 5,640,453 A | 6/1997 | Schuchman et al. |
| 5,642,418 A | 6/1997 | Farris et al. |
| 5,663,896 A | 9/1997 | Aucsmith |
| 5,675,390 A | 10/1997 | Schindler et al. |
| 5,677,895 A | 10/1997 | Mankovitz |
| 5,701,383 A | 12/1997 | Russo et al. |
| 5,701,582 A | 12/1997 | De Bey |
| 5,710,970 A | 1/1998 | Walters et al. |
| 5,715,315 A | 2/1998 | Handelman |
| 5,715,403 A | 2/1998 | Stefik |
| 5,721,829 A | 2/1998 | Dunn et al. |
| 5,724,646 A | 3/1998 | Ganek et al. |
| 5,729,280 A | 3/1998 | Inoue et al. |
| 5,734,853 A | 3/1998 | Hendricks et al. |
| 5,748,732 A | 5/1998 | Le Berre et al. |
| 5,761,302 A | 6/1998 | Park |
| 5,764,762 A | 6/1998 | Kazmierczak et al. |
| 5,784,095 A | 7/1998 | Robbins et al. |
| 5,790,663 A | 8/1998 | Lee et al. |
| 5,790,783 A | 8/1998 | Lee et al. |
| 5,793,971 A | 8/1998 | Fujita et al. |
| 5,805,699 A | 9/1998 | Akiyama et al. |
| 5,826,165 A | 10/1998 | Echeita et al. |
| 5,831,664 A | 11/1998 | Wharton et al. |
| 5,845,240 A | 12/1998 | Fielder |
| 5,848,158 A | 12/1998 | Saito et al. |
| 5,850,218 A | 12/1998 | LaJoie et al. |
| 5,864,747 A | 1/1999 | Clark et al. |
| 5,867,207 A | 2/1999 | Chaney et al. |
| 5,899,582 A | 5/1999 | DuLac |
| 5,912,969 A | 6/1999 | Sasamoto et al. |
| 5,914,941 A | 6/1999 | Janky |
| 5,926,205 A | 7/1999 | Krause et al. |
| 5,930,215 A | 7/1999 | Fite et al. |
| 5,933,500 A | 8/1999 | Blatter et al. |
| 5,936,660 A | 8/1999 | Gurantz |
| 5,937,067 A | 8/1999 | Thatcher et al. |
| 5,953,418 A | 9/1999 | Bock et al. |
| 5,966,186 A | 10/1999 | Shigihara et al. |
| 5,973,756 A | 10/1999 | Erlin |
| 5,978,649 A | 11/1999 | Kahn |
| 5,999,628 A | 12/1999 | Chan |
| 5,999,629 A | 12/1999 | Heer et al. |
| 6,005,937 A | 12/1999 | Lee |
| 6,011,511 A | 1/2000 | Chuong et al. |
| 6,025,314 A | 2/2000 | Nitsch et al. |
| 6,025,868 A | 2/2000 | Russo |
| 6,055,566 A | 4/2000 | Kikinis |
| 6,061,451 A | 5/2000 | Muratani et al. |
| 6,061,452 A | 5/2000 | Suzuki |
| 6,069,647 A | 5/2000 | Sullivan et al. |
| 6,072,873 A | 6/2000 | Bewick |
| 6,072,982 A | 6/2000 | Haddad |
| 6,075,330 A | 6/2000 | Terk |
| 6,091,883 A | 7/2000 | Artigalas et al. |
| 6,097,441 A | 8/2000 | Allport |
| 6,105,134 A * | 8/2000 | Pinder et al. ............... 713/170 |
| 6,144,400 A | 11/2000 | Ebisawa |
| 6,148,081 A | 11/2000 | Szymanski et al. |
| 6,154,206 A | 11/2000 | Ludtke |
| 6,157,719 A * | 12/2000 | Wasilewski et al. ......... 380/210 |
| 6,157,949 A | 12/2000 | Cheng et al. |
| 6,169,879 B1 | 1/2001 | Perlman |
| 6,202,211 B1 | 3/2001 | Williams, Jr. |
| 6,229,895 B1 | 5/2001 | Son et al. |
| 6,240,401 B1 | 5/2001 | Oren et al. |
| 6,263,504 B1 | 7/2001 | Ebisawa |
| 6,266,481 B1 | 7/2001 | Lee et al. |
| 6,286,142 B1 | 9/2001 | Ehreth |
| 6,288,716 B1 | 9/2001 | Humpleman et al. |
| 6,289,455 B1 | 9/2001 | Kocher et al. |
| 6,317,883 B2 | 11/2001 | Marics |
| 6,317,884 B1 | 11/2001 | Eames et al. |
| 6,370,688 B1 | 4/2002 | Hejna, Jr. |
| 6,381,747 B1 | 4/2002 | Wonfor et al. |
| 6,398,245 B1 | 6/2002 | Gruse et al. |
| 6,405,372 B1 | 6/2002 | Kim et al. |
| 6,415,031 B1 | 7/2002 | Colligan et al. |
| 6,437,836 B1 | 8/2002 | Huang et al. |
| 6,456,985 B1 | 9/2002 | Ohtsuka |
| 6,466,671 B1 | 10/2002 | Maillard et al. |
| 6,466,921 B1 | 10/2002 | Cordery et al. |
| 6,473,858 B1 | 10/2002 | Shimomura et al. |
| 6,476,825 B1 | 11/2002 | Croy et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 | 12/2002 | Tillman et al. |
| 6,502,139 B1 | 12/2002 | Birk et al. |
| 6,510,519 B2 | 1/2003 | Wasilewski et al. |
| 6,516,465 B1 | 2/2003 | Paskins |
| 6,519,693 B1 | 2/2003 | De Bey |
| 6,519,772 B1 | 2/2003 | Bopardikar |
| 6,530,085 B1 | 3/2003 | Perlman |
| 6,542,870 B1 | 4/2003 | Matsumoto |
| 6,550,011 B1 | 4/2003 | Sims, III |
| 6,555,580 B2 | 4/2003 | Haning et al. |
| 6,560,340 B1 | 5/2003 | Akins et al. |
| 6,574,609 B1 | 6/2003 | Downs et al. |
| 6,588,017 B1 | 7/2003 | Calderone |
| 6,611,812 B2 | 8/2003 | Hurtado et al. |
| 6,637,027 B1 | 10/2003 | Breslauer et al. |
| 6,654,547 B1 | 11/2003 | Maeda et al. |
| 6,681,326 B2 | 1/2004 | Son et al. |
| 6,697,489 B1 | 2/2004 | Candelore |
| 6,741,834 B1 | 5/2004 | Godwin |
| 6,745,245 B1 | 6/2004 | Carpenter |
| 6,748,080 B2 * | 6/2004 | Russ et al. ............... 380/239 |
| 6,772,434 B1 | 8/2004 | Godwin |
| 6,804,357 B1 | 10/2004 | Ikonen et al. |
| 6,853,728 B1 | 2/2005 | Kahn et al. |
| 6,889,208 B1 | 5/2005 | Okabe et al. |
| 6,904,522 B1 | 6/2005 | Benardeau et al. |
| 6,934,963 B1 | 8/2005 | Reynolds et al. |
| 6,993,499 B2 | 1/2006 | Gagnon et al. |
| 7,035,827 B2 | 4/2006 | Ezaki |
| 7,093,295 B1 | 8/2006 | Saito |
| 7,177,911 B2 | 2/2007 | deCarmo |
| 7,191,155 B2 | 3/2007 | Maruyama et al. |
| 7,191,335 B1 | 3/2007 | Maillard |
| 7,228,439 B2 * | 6/2007 | Sasselli .................. 713/193 |
| 7,403,618 B2 | 7/2008 | Van Rijnsoever et al. |
| 7,409,562 B2 * | 8/2008 | Kahn et al. ............... 713/194 |
| 2001/0001876 A1 | 5/2001 | Morgan et al. |
| 2001/0017920 A1 * | 8/2001 | Son et al. ................ 380/212 |

| | | | |
|---|---|---|---|
| 2001/0046299 | A1 | 11/2001 | Wasilewski et al. |
| 2001/0053979 | A1 | 12/2001 | Kori |
| 2002/0001386 | A1* | 1/2002 | Akiyama .................... 380/201 |
| 2002/0021805 | A1 | 2/2002 | Schumann et al. |
| 2002/0023219 | A1 | 2/2002 | Treffers et al. |
| 2002/0048367 | A1 | 4/2002 | Maillard |
| 2002/0056112 | A1 | 5/2002 | Dureau et al. |
| 2002/0094084 | A1 | 7/2002 | Wasilewski et al. |
| 2002/0101991 | A1 | 8/2002 | Bacon et al. |
| 2002/0112243 | A1 | 8/2002 | Hunter et al. |
| 2002/0116705 | A1 | 8/2002 | Perlman et al. |
| 2002/0162104 | A1 | 10/2002 | Raike et al. |
| 2002/0170054 | A1 | 11/2002 | Kudelski et al. |
| 2002/0170072 | A1 | 11/2002 | Lundbald et al. |
| 2002/0196374 | A1 | 12/2002 | Barry et al. |
| 2003/0026428 | A1 | 2/2003 | Loisel |
| 2003/0040962 | A1 | 2/2003 | Lewis |
| 2003/0061477 | A1* | 3/2003 | Kahn et al. .................. 713/150 |
| 2003/0097622 | A1 | 5/2003 | Liu et al. |
| 2003/0105718 | A1 | 6/2003 | Hurtado et al. |
| 2003/0110132 | A1 | 6/2003 | Sako |
| 2003/0145183 | A1 | 7/2003 | Muehring |
| 2003/0174844 | A1 | 9/2003 | Candelore |
| 2003/0196113 | A1 | 10/2003 | Brown et al. |
| 2003/0208771 | A1 | 11/2003 | Hensgen et al. |
| 2003/0228911 | A1 | 12/2003 | Dernis et al. |
| 2004/0068747 | A1 | 4/2004 | Robertson et al. |
| 2005/0050333 | A1 | 3/2005 | Yeap et al. |
| 2005/0144248 | A1 | 6/2005 | Doganowski et al. |
| 2005/0235361 | A1 | 10/2005 | Alkove et al. |
| 2006/0168663 | A1 | 7/2006 | Viljoen et al. |
| 2006/0179489 | A1 | 8/2006 | Mas Ribes |

FOREIGN PATENT DOCUMENTS

| | | |
|---|---|---|
| EP | 710017 A2 | 5/1996 |
| EP | 0936812 A1 | 8/1999 |
| EP | 0975165 | 1/2000 |
| EP | 0989557 | 3/2000 |
| EP | 0989557 A1 | 3/2000 |
| EP | 1122910 A1 | 8/2001 |
| EP | 1156676 A2 | 11/2001 |
| EP | 1369152 A2 | 2/2003 |
| EP | 1304871 A2 | 4/2003 |
| EP | 0 975165 A2 | 5/2003 |
| EP | 1418701 | 5/2004 |
| GB | 2272822 | 5/1994 |
| GB | 2354392 | 3/2001 |
| JP | 06351023 A | 12/1994 |
| JP | 11136708 A | 5/1999 |
| JP | 2000122933 A | 4/2000 |
| WO | WO 92/11713 | 7/1992 |
| WO | 9907150 A1 | 2/1999 |
| WO | WO 99/18729 | 4/1999 |
| WO | 0008909 A2 | 2/2000 |
| WO | WO 00/13412 | 3/2000 |
| WO | WO 00/14967 | 3/2000 |
| WO | WO 00/19294 | 4/2000 |
| WO | WO 01/22724 | 3/2001 |
| WO | WO 01/37546 | 5/2001 |
| WO | WO 01/43444 A2 | 6/2001 |
| WO | WO 01/65762 | 9/2001 |
| WO | WO 01/99422 | 12/2001 |
| WO | WO 02/15184 A1 | 2/2002 |
| WO | WO 02/065750 A2 | 8/2002 |
| WO | WO 2004/082286 | 9/2004 |

OTHER PUBLICATIONS

Anerousis, N., *SkyCast: The Satellite Digital Broadcast Relay Service*, AT&T Labs Research, unpublished manuscript, 1999, pp. 1-4.
Ma, Huangon; Shin, Kang G.; "Multicast Video on Demand Services"; ACM SIGCOMM Computer Communication Review; vol. 32, Issue 1; Jan. 2002; pp. 31-43; ACM Press; New York, NY.
Tantoui, et al.; "Interaction with Broadcast Video"; International Multimedia Conference Proceedings of the 10$^{th}$ ACM International Conference on Multimedia; pp. 29-38; ACM Press; New York, NY; ISBN: 1-58113-620-X.
Carsten et al.; "Protecting VoD The Easier Way"; International Multimedia Conference Proceedings of the 6$^{th}$ ACM International Conference on Multimedia; pp. 21-28; ACM Press; New York, NY; ISBN: 0-201-30990-4.
RSA Laboratories; "PKCS #1 v2.1: RSA Cryptography Standard"; Jun. 14, 2002; 61 pages.
Tsubakiyama, Hideki and Koga, Keiichiro; "Security for Information Data Broadcasting System with Conditional-Access Control"; IEEE; 1993; pp. 164-170.
EBU Project Group B/CA; "Functional Model of a Conditional Access System"; EBU Technical Review; Jun. 10, 1995; pp. 64-77.
Final Office Action dated Aug. 20, 2007 in U.S. Appl. No. 10/758,818, filed Jan. 16, 2004 by Kahn et al.
Final Office Action dated Oct. 10, 2007 in U.S. Appl. No. 10/790,466, filed Mar. 1, 2004 by Dulac et al.
Non-final Office Action dated Jan. 18, 2008 in U.S. Appl. No. 10/759,679, filed Jan. 19, 2004 by Arsenault et al.
Notice of Allowance dated Dec. 5, 2007 in U.S. Appl. No. 09/620,833, filed Jul. 21, 2000 by Kahn et al.
Notice of Allowance dated Dec. 10, 2007 in U.S. Appl. No. 09/960,824, filed Sep. 21, 2001 by Kahn et al.
Non-final Office Action dated Dec. 4, 2007 in U.S. Appl. No. 10/758,811, filed Jan. 16, 2004 by Kahn et al.
Final Office Action dated Jan. 23, 2008 in U.S. Appl. No. 09/620,772, filed Jul. 21, 2000 by Kahn et al.
EPO Communication dated Mar. 6, 2008 in European counterpart Application No. 05250222.6 of U.S. Appl. No. 10/758,856, filed Jan. 16, 2004 by Raynold M. Kahn et al.
Final Rejection dated Mar. 14, 2008 in U.S. Appl. No. 10/758,818, filed Jan. 16, 2004 by Raynold M. Kahn at al.
EPO Communication dated Nov. 20, 2008 in European patent Application No. 05250222.6 filed Jan. 17, 2005 by Raynold Kahn et al.
Non-final Office Action dated Aug. 21, 2008 in U.S. Appl. No. 10/758,818, filed Jan. 16, 2004 by Raynold M. Kahn et al.
EPO Communication dated Nov. 6, 2008 in European patent Application No. 05250223.4 filed Jan. 17, 2005 by Raynold Kahn et al.
P. Venkat Rangan, et al., "Designing an On-Demand Multimedia Service", IEEE Communications Magazine, Jul. 1992, vol. 30, No. 7, title page and pp. 56-64.
Wanjiun Liao, et al., "The Split and Merge Protocol for Interactive Video-On-Demand", IEEE MultiMedia, Oct.-Dec. 1997, vol. 4, No. 4, index and pp. 51-62.
Robert Johnston, et al., "A Digital Television Sequence Store", IEEE Transactions on Communications, May 1978, vol. COM-26, No. 5, index and pp. 594-600.
"Proposed SMPTE Standard for Television-Splice Points for MPEG-2 Transport Streams", SMPTE Jounal, Oct. 1998, SMPTE 312M, pp. 916-925.
Michael Robin, et al., "Digital Television Fundamentals-Design and Installation of Video and Audio Systems", McGraw-Hill, Chapter 8, title page(s) and pp. 345-425.
Yongchen Li, et al., "Security Enhanced MPEG Player", IEEE, 1996, pp. 169-175.
Fink, Ready to take the dive? It's fast-forward as new DVD and Divx formats hit market (includes graphic: Home video: the next generation plus: Some selections that show off the system), . . . .
Sin-Joo Lee, et al., A Survey of Watermarking Techniques Applied to Multimedia, IEEE, 2001, pp. 272-277.
"PocketTV Brings Video to Palm-size PC", Mar. 9, 2000, 2 pages.
1st Report of EBU/SMPTE Task Force for Harmonized Standards for the Exchange of Television Program Material as Bit Streams, May 6, 1997, Version 1.30, pp. 1-73.
B. Schneier, "Applied Cryptography-Protocols, Algorithms, and Source Code in C", 2nd Edition, pp. 216-222, 357-362.
HP Jornada. 430/430se Palm-size PC: User's Guide, Hewlett Packard, 1999, pp. 7-9.

PocketTV-MPEG movie player for Pocket PC and WinCE, May 17, 2000, MPEG TV, LLC, retrieved from URL: http://web.archive.org/web/20000062l0123803/www.mpegtv.com/wince/pockettv/index.html.

Download PockeTV (beta) for WinCE, Nov. 3, 1999, MPEG TV, LLC, retrieved from HRL: http://web.archive.org/web/19991127093158/www.megtv.com/wince/pocketty/index.html.

Final Rejection dated Feb. 27, 2009 in U.S. Appl. No. 10/758,811 filed Jan. 16, 2004 by Raynold M. Kahn et al.

Notice of Allowance dated Feb. 17, 2009 in U.S. Appl. No. 10/758,818 filed Jan. 16, 2004 by Raynold M. Kahn et al.

* cited by examiner

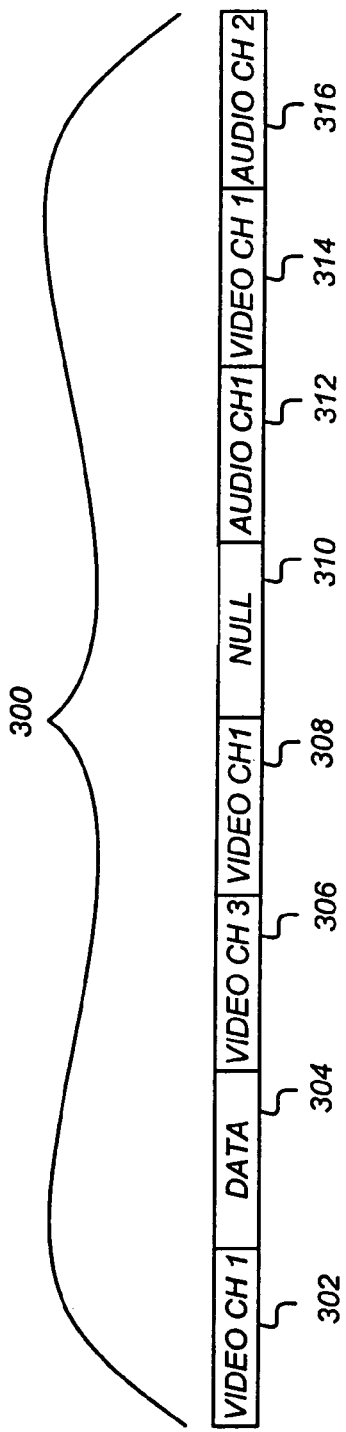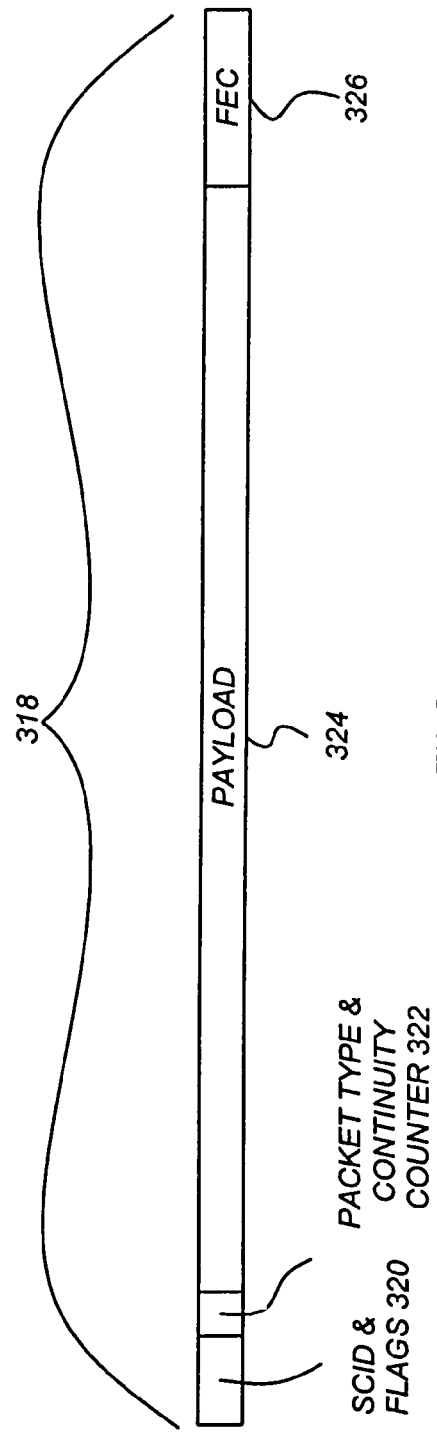

DISTRIBUTION OF VIDEO CONTENT USING CLIENT TO HOST PAIRING OF INTEGRATED RECEIVERS/DECODERS

CROSS-REFERENCE TO RELATED APPLICATIONS

This application is related to the following co-pending and commonly-assigned patent applications, all of which applications are incorporated by reference herein:

U.S. patent application Ser. No. 09/620,832, entitled "VIDEO ON DEMAND PAY PER VIEW SERVICES WITH UNMODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/620,833, entitled "SECURE STORAGE AND REPLAY OF MEDIA PROGRAMS USING A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY, " by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/620,772, entitled "SUPER ENCRYPTED STORAGE AND RETRIEVAL OF MEDIA PROGRAMS WITH SMARTCARD GENERATED KEYS," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/491,959, entitled "VIRTUAL VIDEO ON DEMAND USING MULTIPLE ENCRYPTED VIDEO SEGMENTS," by Robert G. Arsenault and Leon J. Stanger, filed on Jan. 26, 2000;

Application Ser. No. 09/960,824, entitled "METHOD AND APPARATUS FOR ENCRYPTING MEDIA PROGRAMS FOR LATER PURCHASE AND VIEWING," by Raynold M. Kahn, Gregory J. Gagnon, David D. Ha, Peter M. Klauss, Christopher P. Curren, Ronald P. Cocchi, and Thomas H. James, filed Sep. 21, 2001;

Application Ser. No. 09/954,236, entitled "EMBEDDED BLACKLISTING FOR DIGITAL BROADCAST SYSTEM SECURITY," by Raynold M. Kahn, Gregory J. Gagnon, David D. Ha, and Dennis R. Flaherty, filed Sep. 14, 2001;

U.S. patent application Ser. No. 10/302,414, entitled "METHOD AND APPARATUS FOR ENSURING RECEPTION OF CONDITIONAL ACCESS INFORMATION IN MULTI-TUNER RECEIVERS," by Peter M. Klaus; Raynold M. Kahn, Gregory J. Gagnon, and David D. Ha, filed on Nov. 21, 2002;

U.S. patent application Ser. No. 10/302,416, entitled "METHOD AND APPARATUS FOR MINIMIZING CONDITIONAL ACCESS INFORMATION OVERHEAD WHILE ENSURING CONDITIONAL ACCESS INFORMATION RECEPTION N MULTI-TUNER RECEIVERS," by Peter M. Klaus; Raynold M. Kahn, Gregory J. Gagnon, and David D. Ha, filed on Nov. 21, 2002;

PCT international Patent Application Serial No. US02/29881, entitled "METHOD AND APPARATUS FOR CONTROLLING PAIRED OPERATION OF A CONDITIONAL ACCESS MODULE AND AN INTEGRATED RECEIVER AND DECODER," by Raynold M. Kahn and Jordan Levy, A PCT, filed on Sep. 20, 2002;

U.S. Patent Application Ser. No. 10/758,811, entitled "DISTRIBUTION OF VIDEO CONTENTUSING A TRUSTED NETWORK KEY FOR SHARING CONTENT," by Raynold M. Kahn, Gregory J. Gagnon, Christopher P. Curren and Thomas H. James, filed on Jan. 16, 2004; and U.S. Patent Application Ser. No. 10/758,818, entitled "DISTRIBUTION OF BROADCAST CONTENT FOR REMOTE DECRYPTION AND VIEWING," by Raynold M. Kahn, Ronald Cocehi and Gregory J. Gagnon, flied on Jan 16, 2004.

BACKGROUND OF THE INVENTION

1. Field of the Invention

The present invention relates to systems and methods for distributing video content using client to host pairing of integrated receivers/decoders (IRDs).

2. Description of the Related Art

Direct broadcast satellite (DBS) systems have become commonplace in recent years. DBS have been designed to ensure that only paying subscribers receive program materials transmitted by service providers. Among such systems are those which use a conditional access module (typically in the form of a smartcard) that can be removably inserted into the receiver.

One of the disadvantages of existing DBS receivers is that every television requires a separate integrated receiver/decoder (IRD) and conditional access module in order to receive unique programming. Moreover, each of the IRDs requires a tuner and conditional access module in order to receive and decrypt the programming. In addition, each of the IRDs requires a disk drive or other non-volatile storage in order to provide digital video record (DVR) capabilities. All of these components drive up the cost of the IRDs.

Currently, there is no method of a host IRD with a conditional access module securely sharing content one or more client IRDs without a conditional access module. One of the key reasons is that the prior art provides no method for the service provider to selectively control authorized client IRDs. Service providers have no method of preventing widespread, and possible unauthorized, distribution of their program materials if several IRDs are networked together.

The present invention describes an architecture that includes a central or host IRD and one or more lightweight secondary or client IRDs coupled thereto. The present invention also describes a method of encrypting the program materials between the IRDs in the network and a method for the host IRD to know which other client IRDs are allowed on the network using a host-client relationship.

Since these client IRDs are known and trusted by the host IRD, then the host IRD can transmit program materials to the client IRDs. This means that the client IRDs would not require a tuner, conditional access module, or disk drive, since the host IRD is responsible for the reception, descrambling and storage of the program material, and the conditional access module associated with the host IRD is responsible for the reception of media encryption keys for program decryption by host and client IRDs. This allows distribution of the program materials throughout a household or other location at a significantly reduced cost as compared to other schemes, which require full IRDs for each individual subscriber.

SUMMARY OF THE INVENTION

In summary, the present invention describes a method, apparatus and article of manufacture for operatively pairing a host receiver and a client receiver in a direct broadcast satellite system.

Program materials received by the host receiver from the direct broadcast satellite system are decrypted by the host receiver using a media encryption key. The decrypted program materials are then encrypted at the host receiver using a copy protection key.

The copy protection key is generated by the host receiver using content information decrypted by a receiver key uniquely associated with the host receiver. The content information may comprise a content identifier obtained from the program materials, and may also include copy control information.

The copy protection key is encrypted at the host receiver using a host-client pairing key shared between the host receiver and client receiver. The encrypted program materials and the encrypted copy protection key are then transferred from the host receiver to the client receiver.

The transferred copy protection key received by the client receiver from the host receiver is decrypted at the client receiver using the host-client pairing key. The transferred program materials received by the client receiver from the host receiver are then decrypted at the client receiver using the decrypted copy protection key.

BRIEF DESCRIPTION OF THE DRAWINGS

Referring now to the drawings in which like reference numbers represent corresponding parts throughout:

FIG. 3A is a diagram of a representative data stream according to the preferred embodiment of the present invention;

FIG. 3B is a diagram of a representative data packet according to the preferred embodiment of the present invention;

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Direct Broadcast Satellite System

Figure 1:
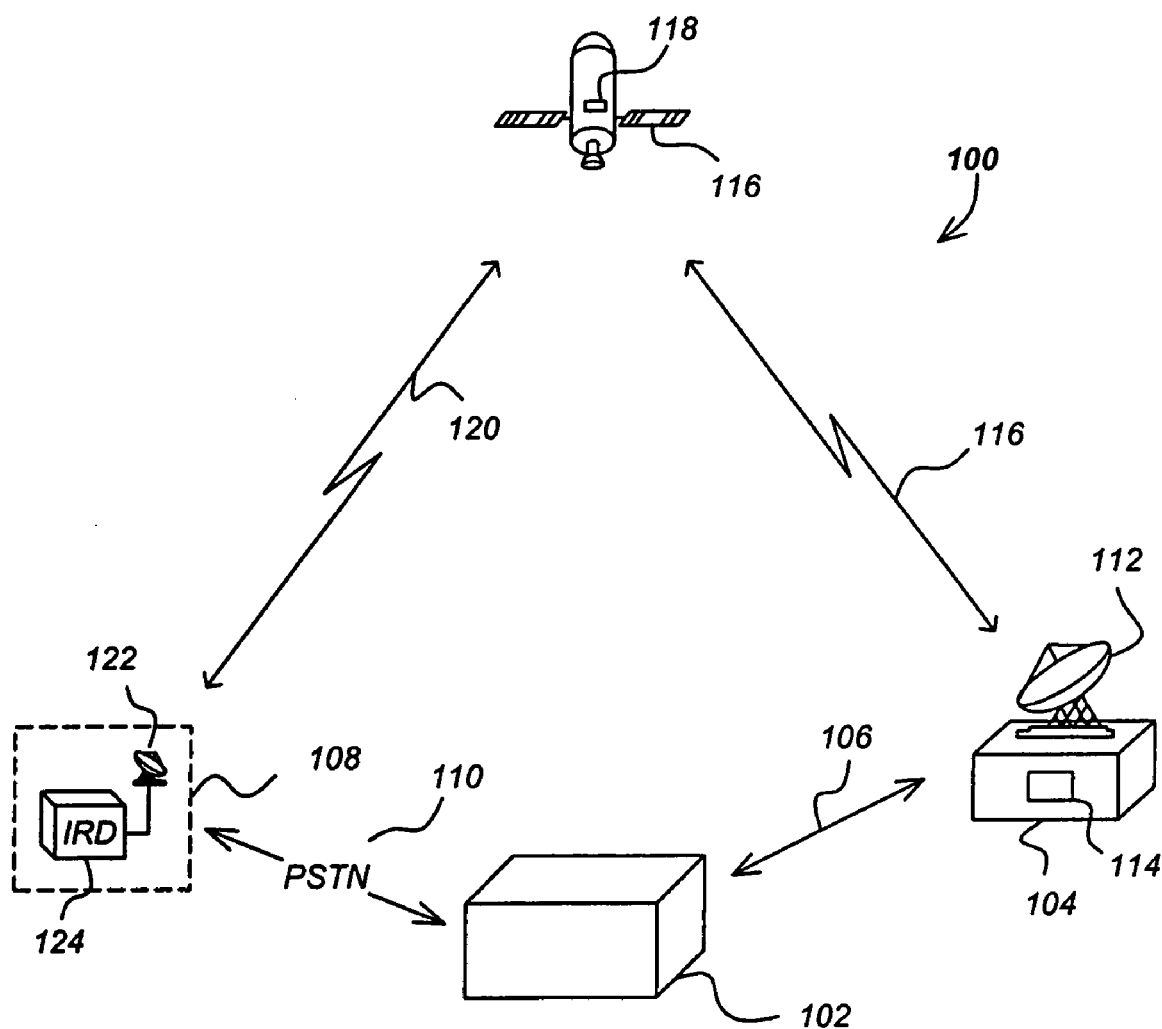
FIG. 1 is a diagram illustrating an overview of a direct broadcast satellite system according to a preferred embodiment of the present invention.

FIG. 1 is a diagram illustrating an overview of a direct broadcast satellite system 100 according to a preferred embodiment of the present invention. The system 100 includes a control center 102 operated by a service provider in communication with an uplink center 104 via a ground link 106 and with subscriber receiving stations 108 via a link 110. The control center 102 provides program materials to the uplink center 104 and coordinates with the subscriber receiving stations 108 to offer various services, including key management for encryption and decryption, pay-per-view (PPV), billing, etc.

The uplink center 104 receives the program materials from the control center 102 and, using an uplink antenna 112 and transmitter 114, transmits the program materials to one or more satellites 116, each of which may include one or more transponders 118. The satellites 116 receive and process this program material, and re-transmit the program materials to subscriber receiving stations 108 via downlink 120 using transmitter 118. Subscriber receiving stations 108 receive the program materials from the satellites 116 via an antenna 122, and decrypt and decode the program materials using an integrated receiver/decoder (IRD) 124.

Uplink Configuration

Figure 2:
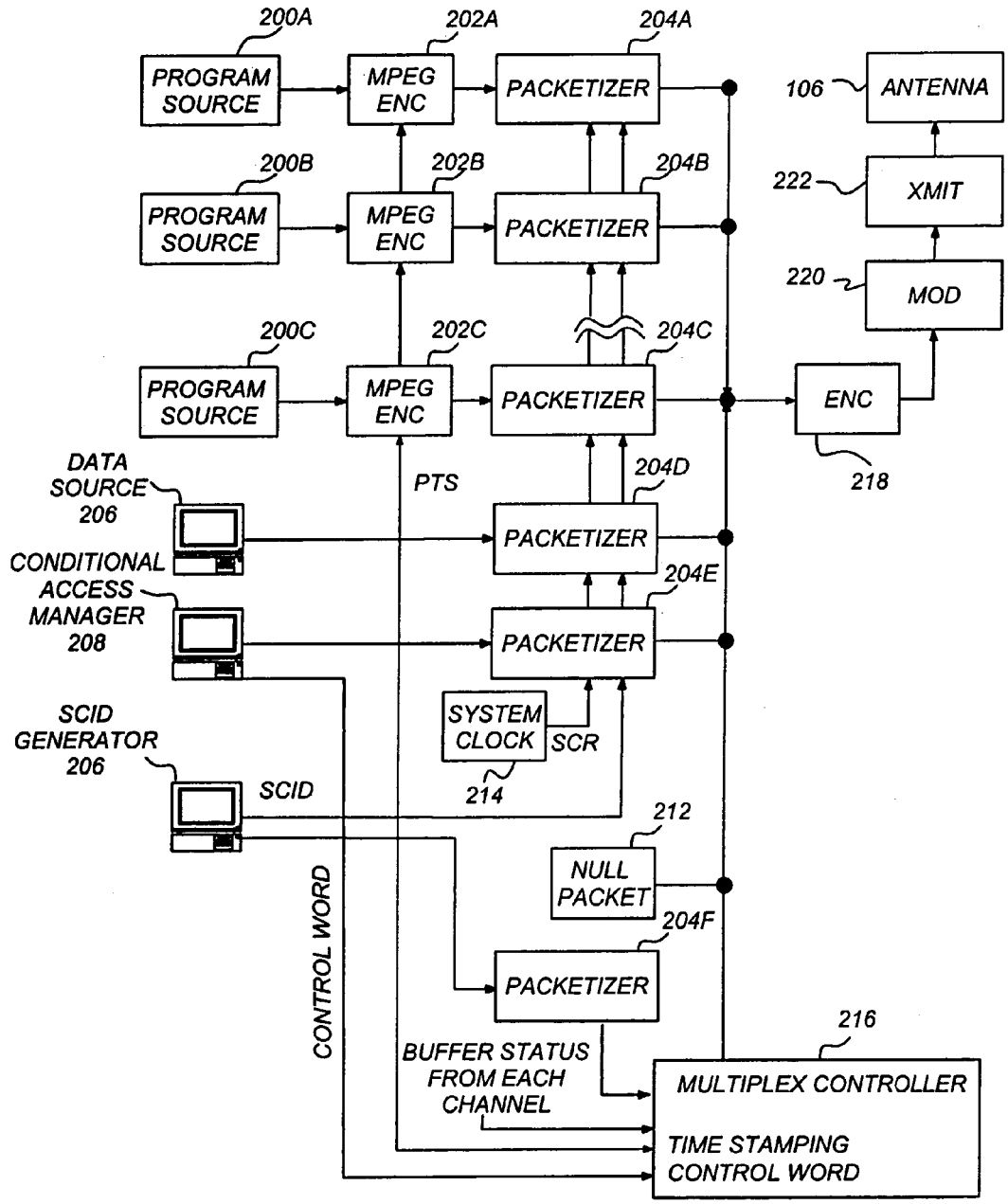
FIG. 2 is a block diagram showing a typical uplink configuration for a single satellite transponder, showing how program materials and program control information are uplinked to the satellite by the control center and the uplink center.

FIG. 2 is a block diagram showing a typical uplink center 104 configuration for a single transponder 118, showing how program materials and program control information are uplinked to the satellite 116 by the control center 102 and the uplink center 104.

One or more channels are provided by program sources 200A-200C, which may comprise one or more video channels augmented respectively with one or more audio channels.

The data from each program source 200A-200C is provided to a corresponding encoder 202A-202C, which in one embodiment comprise Motion Picture Experts Group (MPEG) encoders, although other encoders can be used as well. After encoding by the encoders 202A-202C, the output therefrom is converted into data packets by corresponding packetizers 204A-204C.

In addition to the program sources 200A-200C, data source 206 and conditional access manager 208 may provide one or more data streams for transmission by the system 100. The data from the data source 206 and conditional access manager 208 is provided to a corresponding encoder 202D-202E. After encoding by the encoders 202D-202E, the output therefrom is converted into data packets by corresponding packetizers 204D-204E.

A system channel identifier (SCID) generator 210, null packet (NP) generator 212 and system clock 214 provide control information for use in constructing a data stream for transmission by the system 100. Specifically, the packetizers 204A-204F assemble data packets using a system clock reference (SCR) from the system clock 214, a control word (CW) generated by the conditional access manager 208, and a system channel identifier (SCID) from the SCID generator 210 that associates each of the data packets that are broadcast to the subscriber with a program channel.

Each of the encoders 202A-202C also accepts a presentation time stamp (PTS) from a multiplex controller 216. The PTS is a wrap-around binary time stamp that is used to assure that the video channels are properly synchronized with the audio channels after encoding and decoding.

Finally, these data packets are then multiplexed into a serial data stream by the controller 216. The data stream is then encrypted by an encryption module 218, modulated by a modulator 220, and provided to a transmitter 222, which broadcasts the modulated data stream on a frequency bandwidth to the satellite 116 via the antenna 106.

Representative Data Stream

FIG. 3A is a diagram of a representative data stream 300 according to the preferred embodiment of the present invention. The first packet 302 comprises information from video channel 1 (data coming from, for example, the first program source 200A); the second packet 304 comprises computer data information that was obtained, for example from the computer data source 206; the third packet 306 comprises information from video channel 3 (from one of the third program source 200C); the fourth packet 308 includes information from video channel 1 (again, from the first program source 200A); the fifth packet 310 includes a null packet (from the NP generator 212); the sixth packet 312 includes information from audio channel 1 (again, from the first program source 200A); the seventh packet 314 includes information from video channel 1 (again, from the first program source 200A); and the eighth packet 316 includes information from audio channel 2 (from the second program source 200B). The data stream therefore comprises a series of packets from any one of the program and/or data sources in an order determined by the controller 216. Using the SCID, the IRD 124 reassembles the packets to regenerate the program materials for each of the channels.

FIG. 3B is a diagram of a representative data packet 318 according to the preferred embodiment of the present invention. Each data packet segment 318 is 147 bytes long, and comprises a number of packet segments 320-326. The first segment 320 comprises two bytes of information containing the SCID and flags. The SCID is a unique 12-bit number that uniquely identifies the channel associated with the data packet 318. The flags include 4 bits that are used to control whether the data packet 318 is encrypted, and what key must be used to decrypt the data packet 318. The second segment 322 is made up of a 4-bit packet type indicator and a 4-bit continuity counter. The packet type identifies the packet as one of the four data types (video, audio, data, or null). When combined with the SCID, the packet type determines how the data packet 318 will be used. The continuity counter increments once for each packet type and SCID. The third segment 324 comprises 127 bytes of payload data. The fourth segment 326 is data required to perform forward error correction on the data packet 318.

Encryption of Program Materials

As noted above, program materials are encrypted by the encryption module 218 before transmission to ensure that they are received and viewed only by authorized IRDs 124. The program materials is encrypted according to an encryption key referred to hereinafter as a control word (CW). This can be accomplished by a variety of data encryption techniques, including symmetric algorithms, such as the data encryption standard (DES), and asymmetric algorithms, such as the Rivest-Shamir-Adleman (RSA) algorithm.

To decrypt the program material, the IRD 124 must also have access to the associated CW. To maintain security, the CW is not transmitted to the IRD 124 in plaintext. Instead, the CW is encrypted before transmission to the IRD 124. The encrypted CW is transmitted to the IRD 124 in a control word packet (CWP), i.e., a data packet type as described in FIG. 3B.

In one embodiment, the data in the CWP, including the CW, is encrypted and decrypted via what is referred to hereinafter as an input/output (I/O) indecipherable algorithm. An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are dynamic or non-static (that is, they change as a function of time). When such an algorithm is provided with identical input streams, the output stream provided at a given point in time may be different than the output stream provided at another time.

So long as the encryption module 218 and the IRD 124 share the same I/O indecipherable algorithm, the IRD 124 can decode the information in the encrypted CWP to retrieve the CW. Then, using the CW, the IRD 124 can decrypt the program materials so that it can be displayed or otherwise presented.

Integrated Receiver/Decoder

Figure 4:
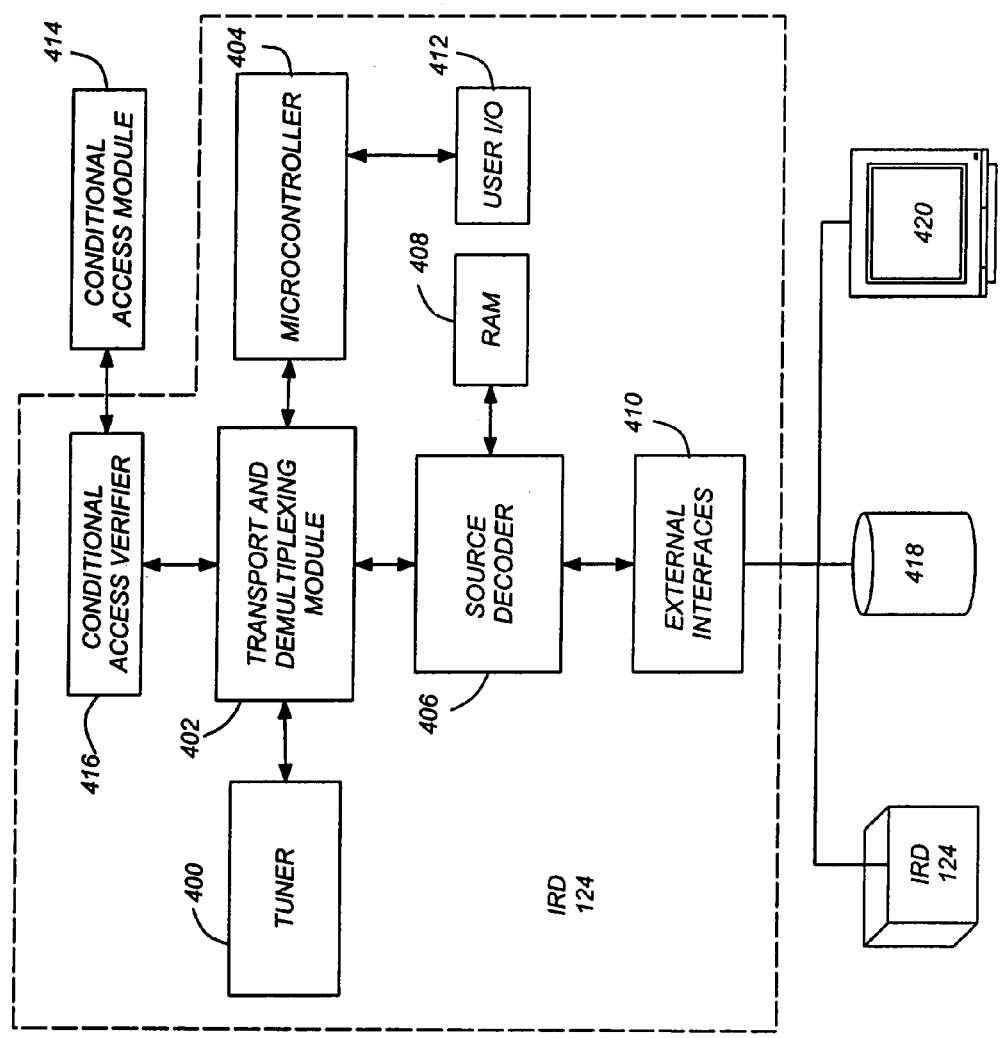
FIG. 4 is a simplified block diagram of an integrated receiver/decoder according to the preferred embodiment of the present invention.

FIG. 4 is a simplified block diagram of an IRD 124 according to the preferred embodiment of the present invention. The IRD 124 includes a tuner 400, a transport and demultiplexing module (TDM) 402 that operates under the control of a microcontroller 404 to perform transport, demultiplexing, decryption and encryption functions, a source decoder 406, random access memory (RAM) 408, external interfaces 410, user I/O 412, a conditional access module (CAM) 414, and conditional access verifier (CAV) 416.

The tuner 400 receives the data packets from the antenna 122 and provides the packets to the TDM 402. Using the SCIDs associated with the program materials, the TDM 402 and microcontroller 404 reassemble the data packets according to the channel selected by the subscriber and indicated by the user I/O 412, and decrypt the program materials using the CW.

Once the program materials have been decrypted, they are provided to the source decoder 406, which decodes the program materials according to MPEG or other standards as appropriate. The decoded program materials may be stored in the PAM 408 or provided to devices coupled to the IRD 124 via the external interfaces 410, wherein the devices coupled to the IRD 124 can include a media storage device 418, such as a disk drive, a presentation device 420, such as a monitor, or a networked device, such as another IRD 124.

The CAM 414 is typically implemented in a smartcard or similar device, which is provided to the subscriber to be inserted into the IRD 124. The CAM 414 interfaces with the CAV 416 and the TDM 402 to verify that the IRD 124 is entitled to access the program materials.

The CW is obtained from the CWP using the CAV 416 and the CAM 414. The TDM 402 provides the CWP to the CAM 414 via the CAV 416. The CAM 414 uses the I/O indecipherable algorithm to generate the CW, which is provided back to the TDM 402. The TDM 402 then uses the CW to decrypt the program materials.

In one embodiment including a plurality of networked IRDs 124, one of the IRDs 124 is designated a "host IRD" and each of the other IRDs are designated as a "client IRD". In such an embodiment, the host IRD 124 includes all of the components described in FIG. 4, while the client IRDs 124 are simpler and do not include a tuner 400, CAM 414, CAV 416, disk drive 418, or other components, in order to reduce the cost of the client IRD 124. The client IRD 124 can be used to request program materials that are received or reproduced by the host IRD 124, thus allowing program materials to be reproduced at other locations in the home.

However, in this embodiment, the host and client ERDs 124 share a host-client pairing key (HCPK) that is generated by the service provider for the purposes of sharing the program materials among the IRDs 124. Consequently, the HCPK permits distribution of video content between a host IRD 124 and one or more client IRDs 124 using a client-to-host pairing.

Operative Pairing the Host IRD and CAM

Figure 5:
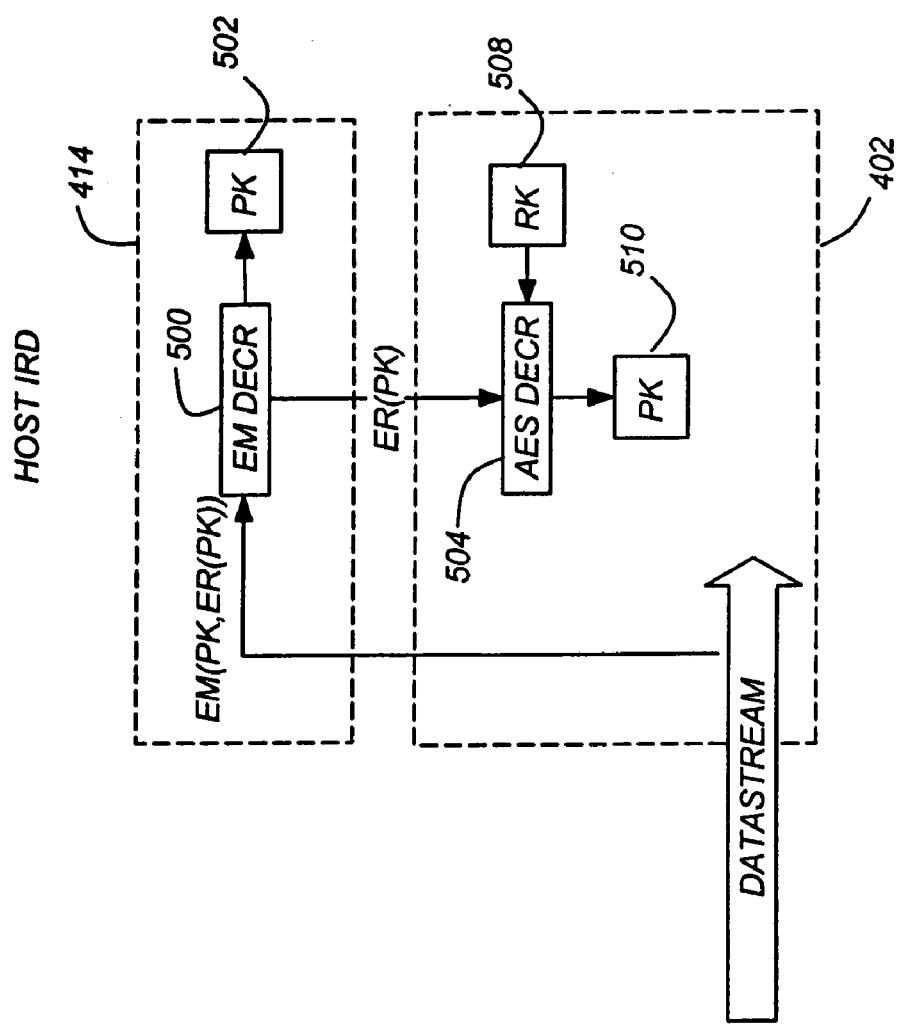
FIG. 5 is a logical flow illustrating how the host IRD and conditional access module (CAM) are operatively paired according to the preferred embodiment of the present invention.

FIG. 5 is a logical flow illustrating how the host IRD 124 and CAM 414 are operatively paired according to the preferred embodiment of the present invention.

After the subscriber has purchased and installed the host IRD 124 and associated hardware, the subscriber supplies a unique identifier (such as a serial number) for the host IRD 124 to the service provider. The unique identifier is itself uniquely associated with a secret receiver key (RK). This association is implemented in the IRD 124 itself, and is known to the service provider. Thereafter, the service provider determines a pairing key (PK) that will be used to encrypt communications between the CAM 414 and the IRD 124.

The PK is then encrypted by the service provider using the RK, to produce an encrypted PK, denoted ER(PK), wherein the ER( ) indicates tat RK encryption is used and the PK indicates that the PK is encrypted. A message for the CAM 414 comprising the PK and the ER(PK) is generated by the service provider, and the message is encrypted using a conditional access message encryption algorithm to produce EM(PK, ER (PK)), wherein the EM( ) indicates that conditional access message encryption is used and the ER(PK) indicates that the PK is encrypted.

The EM(PK, ER(PK)) is then transmitted to the IRD 124 where it is received by the tuner 400 and TDM 402. The TDM 402 routes data packets with the encrypted message EM(PK, ER(PK)) to the CAM 414 for decryption.

In the CAM 414, the EM(PK,ER(PK)) is decrypted by a message decryption algorithm (EM DECR) 500 to produce the decrypted PK, which is stored in a secure memory 502 in the CAM 414. The ER(PK) is provided from the CAM 414 to the TDM 402, and since it is encrypted using the RK, it is not exposed in plaintext. (In this embodiment, ER(PK) is delivered to the TDM 402 via the CAM 414, but an alternative embodiment might deliver ER(PK) directly to the TDM 402).

In the TDM 402, the ER(PK) is decrypted by an Advanced Encryption Standard (AES) decryption algorithm (AES DECR) 504 using the RK 506 to produce the decrypted PK, which is then in a secure memory 508. This PK, now stored in both the IRD 124 and the CAM 414, is used to encrypt communications between the CAM 414 and the IRD 124, as desired.

For example, using the PK, the CAM 414 encrypts the CW to produce EPK(CW), wherein the EPK( ) indicates that PK encryption is used and the CW indicates that the CW is encrypted. The TDM 402 decrypts the EPK(CW) received from the CAM 414. Since the EPK(CW) can only be decrypted by an IRD 124 that contains the appropriate PK, this cryptographically binds ("pairs") the CAM 414 and the IRD 124.

Operatively Pairing the Host and Client IRDS

Figure 6:
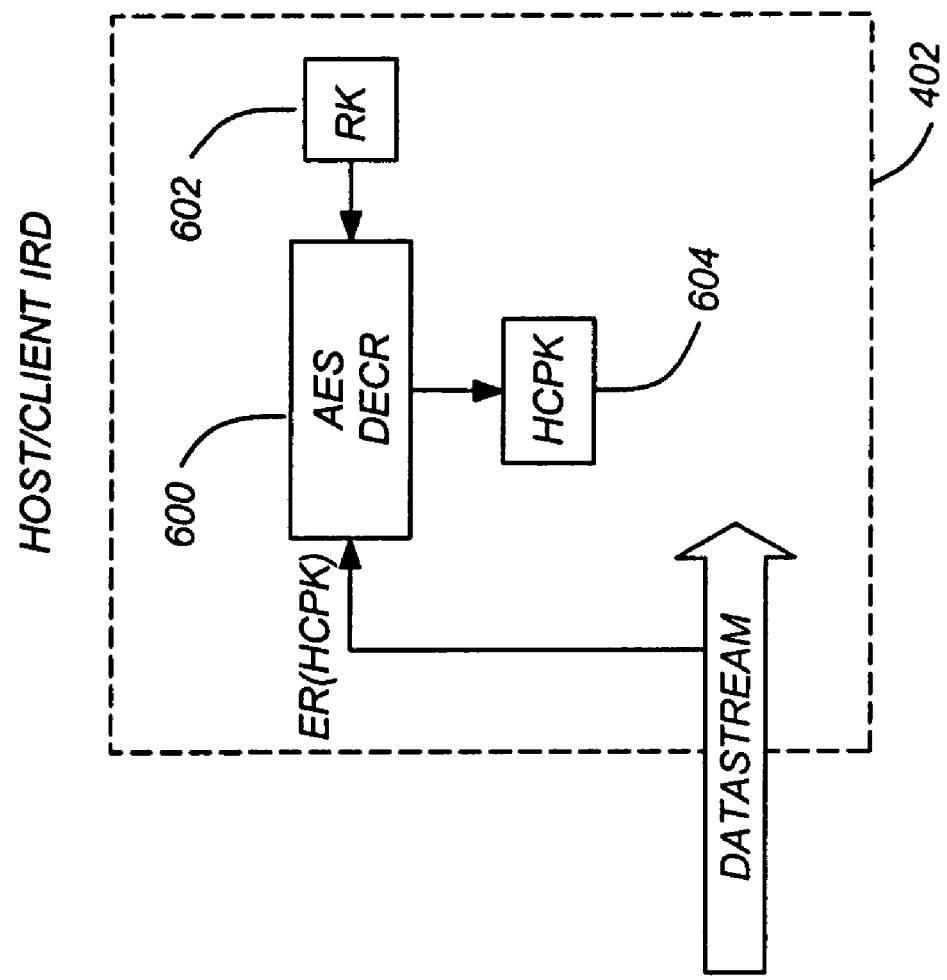
FIG. 6 is a logical flow illustrating how the host and client IRDs are operatively paired according to the preferred embodiment of the present invention.

FIG. 6 is a logical flow illustrating how the host and client IRDs 124 are operatively paired according to the preferred embodiment of the present invention.

The present invention also provides for pairing between a host IRD 124 and one or more client IRDs 124, to ensure that program materials are never shared between the host IRD 124 and client IRDs 124 in plaintext. The pairing of the host IRD 124 and client IRDs 124 is accomplished by the use of a host-client pairing key (HCPK).

As noted above, the subscriber supplies a unique identifier (such as a serial number) for the host IRD 124 to the service provider, wherein the unique identifier is associated with a secret receiver key (RK), wherein the association is implemented in the IRD 124 itself and is known to the service provider.

After activating the host IRD 124, the subscriber can request the activation of additional client IRDs 124 using the same method. Consequently, the service provider would determine the RK for each of the client IRDs 124 as well.

Thereafter, the service provider establishes the HCPK for a particular combination of host and client IRDs 124. Preferably, the service provider encrypts the HCPK, using the AES algorithm with RKH, the RK of the host IRD 124, and RKC, the RK of the client IRD 124, thereby creating two ER(HPCK) messages containing the encrypted HCPK, i.e., ERH(HCPK) for the host IRD 124 and ERC(HCPK) for the client IRD 124.

The service provider sends one or more messages to the host IRD 124, using an ID for the CAM 414 of the host IRD 124 for over-the-air addressing of the message, and specifying both a Host ID (HID) and a Client ID (CLID), wherein the CLID identifies the client IRDs 124 to the host IRD 124. The message is received by the host IRD 124, and then stored on disk drive 418 or other non-volatile memory in the host IRD 124. A large number of such messages can be stored on the disk drive 418 in the host IRD 124, e.g., one for each client IRD 124 networked with the host IRD 124.

Any number of such encrypted versions of the HCPK can be stored in the host, IRD 124. For example, there may be a different HCPK for each pairing of a client IRD 124 networked with the host IRD 124. On the other hand, a host IRD 124 may share the same HCPK with all the client IRDs 124.

Preferably, the host IRD 124 receives both of the ERH (HCPK) and ERC(HPCK) messages off-air and, at some later time, the ERC(HCPK) for the client IRD 124 is obtained by the client IRD 124 from the host IRD 124. This may occur, for example, when a client IRD 124 is activated or powered up.

In both the host and client IRDs 124, the ER(HCPK) (which is either ERH(HPCK) or ERC(HCPK)) is decrypted by an AES decryption algorithm (AES DECR) 600 in the TDM 402 using the appropriate RK 602 (which is either RKH or RKC), and the decrypted HCPK is stored in a secure memory 604 in the host and client IRDs 124.

Consequently, the service provider, through the assignment of the HCPK, establishes a client-to-host pairing relationship between the host IRD 124 and one or more client IRDs 124 forming a network, so that the program materials are shared in secure manner within the network.

Sharing Program Materials Between Host and Client IRDS

Figure 7:
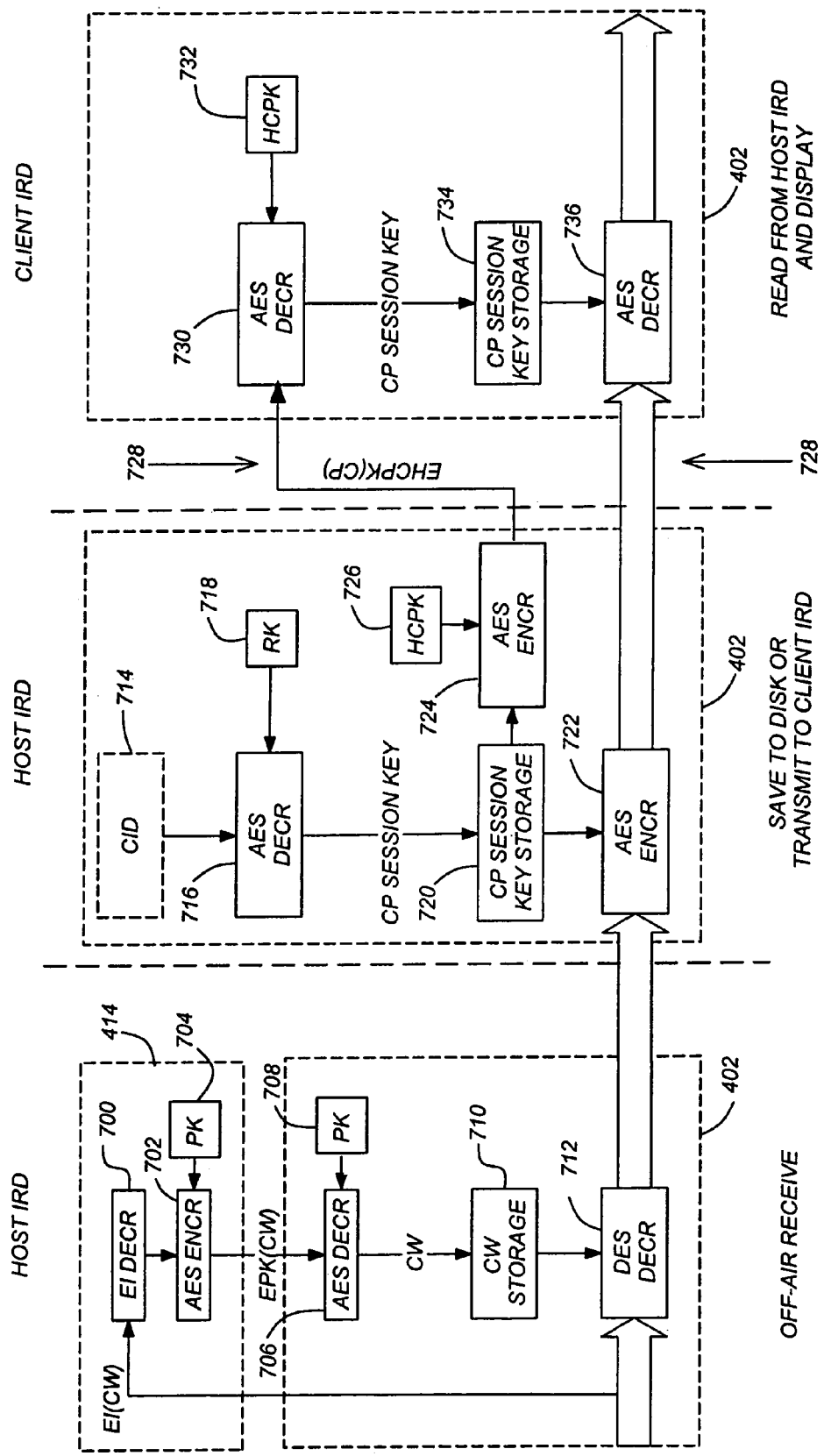
FIG. 7 is a logical flow illustrating how the program materials may be shared between host and client IRDs according to the preferred embodiment of the present invention.

FIG. 7 is a logical flow illustrating how the program materials may be shared between host and client IRDs 124 according to the preferred embodiment of the present invention.

In the portion of FIG. 7 labeled "Off-Air Receive," the host IRD 124 receives a data stream including the program materials encrypted by the media encryption key CW, as well as the encrypted media encryption key EI(CW) itself. The EI(CW) is provided, via the TDM 402, to the CAM 414, where it is decrypted by an I/O indecipherable algorithm (EI DECR) 700. The result is the unencrypted media encryption key CW.

The unencrypted CW is then re-encrypted by the CAM 414 by an AES encryption algorithm (AES ENCR) 702 using the PK 704 stored in the CAM 414 to produce a re-encrypted media encryption key EPK(CW).

The re-encrypted media encryption key EPK(CW) is provided to the TDM 402, where it is decrypted by an AES decryption algorithm (AES DECR) 706 using the PK 708 stored in the TDM 402, in order to obtain the unencrypted media encryption key CW. The unencrypted CW is then stored in a CW storage 710, and used when necessary by a Data Encryption Standard (DES) decryption algorithm (DES DECR) 712 to decrypt the program material.

In the portion of FIG. 7 labeled "Save to Disk or Transmit to Client IRD," the content identification (CID) information 714 is decrypted by an AES decryption algorithm (AES DECR) 716 using the RK 718 stored in the TDM 402, in order to generate a Copy Protection (CP) session key for encrypting and decrypting the program materials shared with the client IRD 124. The CID information 714 preferably comprises a content identifier that is obtained from properties and/or metadata found in the program materials, and may include copy control information (CCI).

After the CP session key is generated by the AES decryption algorithm 716, the CP session key is then stored in the memory 720 of the TDM 402. Thereafter, the CP session key is retrieved from the memory 720 of the TDM 402 for use in encrypting the program materials by a 3DES encryption algorithm (AES ENCR) 722.

Since the program materials are encrypted with the CP session key generated by the host IRD 124, the client IRD 124 must be able to receive the CP session key from the host IRD 124 in a secure manner. To accomplish this task, the CP session key is encrypted by an AES encryption algorithm (AES ENCR) 724 using the HCPK 726 stored in the TDM 402, to produce an encrypted CP session key EHCPK(CP).

Finally, both the encrypted program materials and the encrypted copy protection key are transferred from the host IRD 124 to the client IRD 124, as represented by 728.

In the portion of FIG. 7 labeled "Read from Host IRD and Display," the client IRD 124 obtains the encrypted CP session key EHCPK(CP) from the host IRD 124, which is then decrypted by an AES decryption algorithm (AES DECR) 730 using the HCPK 732. As noted above, the client IRD 124 had been previously been provided the HCPK 732 by the service provider.

After the CP session key is generated by the AES decryption algorithm 730, the CP session key is then stored in the memory 734 of the TDM 402. Thereafter, the CP session key is retrieved from the memory 734 of the TDM 402 for use in decrypting the program materials by the AES decryption algorithm (AES DECR) 736. The client IRD 124 can then display the program materials on a presentation device 420 coupled to the client IRD 124.

Consequently, the host IRD 124 can control access to the program materials, by selective encryption of the program materials and CP session key that are then transmitted to appropriate client IRDs 124. The program materials are only encrypted once, by the host IRD 124, and are delivered to the client IRD 124 only in encrypted form, together with the CP session key necessary to decrypt the program materials.

One of the advantages to this method is that it allows the host IRD 124 to control which of the client IRDs 124 receives the program materials. This could be an advantage if the service provider wishes to have several tiers of services for the client IRDs 124. This could also allow subscribers to selectively control which program materials are distributed to which client IRD 124 if limits, either rating or spending, are to be set. Also, if a client IRD 124 is suspected of not being in the location indicated or is being used for pirating purposes, the distribution of program materials to that client IRD 124 could be terminated without disrupting services to other client IRDs 124 in the network. The disadvantage of this system would be the number of keys that would be required for each pairing and the bookkeeping of all of these keys. Both of these issues are not serious and could be overcome by careful system planning.

As noted above, since this method does not require the client IRD 124 to perform any traditional conditional access tasks, no CAM 414 is required on the client IRD 124. Also, since the client IRD 124 does not need to receive program materials from an off-air signal, no tuner is required in the client IRD 124. Finally, no disk drive 418 is required in the client IRD 124, since client IRDs 124 may use the disk drive 418 of the host IRD 124 as a "virtual" disk. All of this leads to greatly reduced cost of the client IRDs 124.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching.

For example, while the foregoing disclosure presents an embodiment of the present invention as it is applied to a direct broadcast satellite system, the present invention can be applied to any system that uses encryption. Moreover, although the present invention is described in terms of specific encryption and decryption schemes, it could also be applied to other encryption and decryption schemes, or to different uses of the specific encryption and decryption schemes. Finally, although specific hardware, software and logic is described herein, those skilled in the art will recognize that other hardware, software or logic may accomplish the same result, without departing from the scope of the present invention.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of operatively pairing a host receiver and a client receiver in a broadcast system, comprising:
   (a) receiving encrypted program materials, generated by a service provider, at one or more subscriber receiving stations, at least one of the subscriber receiving stations being comprised of a plurality of networked receivers, wherein the networked receivers include at least one host receiver and at least one client receiver;
   (b) decrypting the received program materials at the host receiver;
   (c) re-encrypting the decrypted program materials at the host receiver using a copy protection key;
   (d) encrypting the copy protection key at the host receiver using a host-client pairing key generated by the service provider and shared between the host receiver and client receiver in order to share the program materials between the host receiver and client receiver, wherein the service provider establishes the host-client pairing key for a particular combination of the host and client receivers;
   (e) transferring the re-encrypted program materials and the encrypted copy protection key from the host receiver to the client receiver;
   (f) decrypting the transferred copy protection key at the client receiver using the host-client pairing key; and
   (g) decrypting the transferred program materials at the client receiver using the decrypted copy protection key.

2. The method of claim 1, wherein the program materials received by the host receiver are decrypted using a media encryption key.

3. The method of claim 1, wherein the host-client pairing key is received by both the host receiver and the client receiver from the broadcast system.

4. The method of claim 3, further comprising decrypting the host-client pairing key at the host receiver using a receiver key uniquely associated with the host receiver.

5. The method of claim 4, wherein the copy protection key is generated by the host receiver using content information decrypted by the receiver key uniquely associated with the host receiver.

6. The method of claim 5, wherein the content information comprises a content identifier.

7. The method of claim 6, wherein the content identifier is obtained from the program materials.

8. The method of claim 6, wherein the content identifier further comprises copy control information.

9. The method of claim 3, further comprising decrypting the host-client pairing key at the client receiver using a receiver key uniquely associated with the client receiver.

10. The method of claim 1, wherein the particular combination of the host and client receivers results in a different host-client pairing key for each pairing of the client receiver with the host receiver.

11. The method of claim 1, wherein the particular combination of the host and client receivers results in the host receiver sharing the host-client pairing key with all client receivers.

12. An apparatus for operatively pairing a host receiver and a client receiver in a broadcast system, comprising:
   (a) means for receiving encrypted program materials, generated by a service provider, at one or more subscriber receiving stations, at least one of the subscriber receiving stations being comprised of a plurality of networked receivers, wherein the networked receivers include at least one host receiver and at least one client receiver;
   (b) means for decrypting the received program materials at the host receiver;
   (c) means for re-encrypting the decrypted program materials at the host receiver using a copy protection key;
   (d) means for encrypting the copy protection key at the host receiver using a host-client pairing key generated by the service provider and shared between the host receiver and client receiver in order to share the program materials between the host receiver and client receiver, wherein the service provider establishes the host-client pairing key for a particular combination of the host and client receivers;
   (e) means for transferring the re-encrypted program materials and the encrypted copy protection key from the host receiver to the client receiver;
   (f) means for decrypting the transferred copy protection key at the client receiver using the host-client pairing key; and
   (g) means for decrypting the transferred program materials at the client receiver using the decrypted copy protection key.

13. The apparatus of claim 12, wherein the program materials received by the host receiver are decrypted using a media encryption key.

14. The apparatus of claim 12, wherein the host-client pairing key is received by both the host receiver and the client receiver from the broadcast system.

15. The apparatus of claim 14, further comprising means for decrypting the host-client pairing key at the host receiver using a receiver key uniquely associated with the host receiver.

16. The apparatus of claim 15, wherein the copy protection key is generated by the host receiver using content information decrypted by the receiver key uniquely associated with the host receiver.

17. The apparatus of claim 16, wherein the content information comprises a content identifier.

18. The apparatus of claim 17, wherein the content identifier is obtained from the program materials.

19. The apparatus of claim 18, wherein the content identifier further comprises copy control information.

20. The apparatus of claim 14, further comprising means for decrypting the host-client pairing key at the client receiver using a receiver key uniquely associated with the client receiver.

21. The apparatus of claim 12, wherein the particular combination of the host and client receivers results in a different host-client pairing key for each pairing of the client receiver with the host receiver.

22. The apparatus of claim 12, wherein the particular combination of the host and client receivers results in the host receiver sharing the host-client pairing key with all client receivers.

* * * * *